May 27, 1930.    R. PALMER    1,760,519
SOLDERING IRON
Filed Dec. 29, 1926
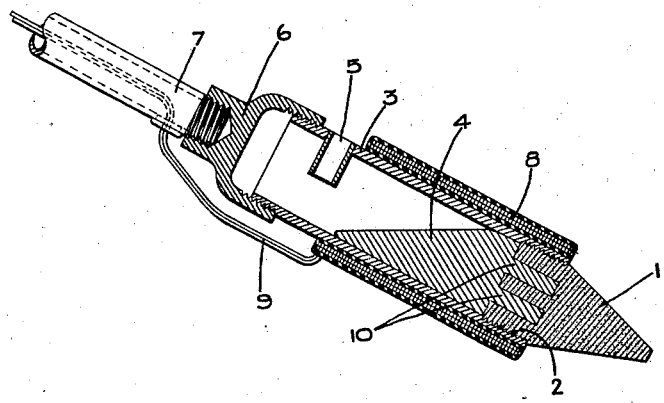
Inventor:
Robert Palmer,
by
His Attorney.

Patented May 27, 1930

1,760,519

UNITED STATES PATENT OFFICE

ROBERT PALMER, OF NISKAYUNA, NEW YORK, ASSIGNOR TO GENERAL ELECTRIC COMPANY, A CORPORATION OF NEW YORK

SOLDERING IRON

Application filed December 29, 1926. Serial No. 157,796.

My invention relates to soldering irons and has for its object the provision of a simple and reliable self feeding soldering iron.

In carrying out my invention in one form I provide a soldering tip made of porous material, such as sintered tungsten, which serves to apply the solder uniformly to the work.

For a more complete understanding of my invention reference should be had to the accompanying drawing, the single figure of which is a sectional view of an electric soldering iron embodying my invention.

Referring to the drawing, I have shown my invention in one form in connection with an electric soldering iron although obviously any form of heat may be used as well as different arrangements of the soldering iron itself. The device comprises a soldering tip 1 made of a porous material which is wet by the molten solder. I have found that sintered tungsten is a very satisfactory material for this purpose. The tip 1 is provided with bevelled soldering surfaces at one end and at its opposite end it is provided with threads 2 by means of which it may be secured in the threaded bore of a tubular supporting member 3 forming a reservoir for the solder 4. An aperture in which a short tube 5 is secured is provided adjacent the upper end of the member 3 through which the molten solder may be inserted into the interior of the member 3. The tube 5 extends substantially half way across the member 3 and prevents escape of the molten solder in case the iron is laid down. The upper end of the member 3 is closed by a screw cap 6 to which in turn a suitable tube 7 is secured. A suitable handle, not shown, may be provided on the opposite end of the tube 7.

As a source of heat I have shown an electric heating unit 8 of any suitable form which, for example, may be tubular and fit closely around the member 3, as shown. The terminals 9 of the heating unit may be led through the tubular member 7 and handle in the well known manner customary with electric soldering irons.

This soldering iron may be used for the same purposes as various other types of soldering irons. The solder 4 in the reservoir formed by the member 3 is maintained molten by the heating unit 8 and is absorbed by the sintered tungsten tip 1 in the manner that water or other liquids are absorbed by a sponge, and when the tip is passed over the articles to be soldered molten solder is deposited thereon. In order to increase the area of the tungsten tip exposed to the molten solder and increase the rate of absorption of solder, I have provided recesses 10 in the end of the tip which is inserted in the support 3. I have found that when the tip is drawn over the work a thin film of solder is deposited which might be compared with the deposit of water from a sponge. This principle of applying solder by means of a porous tip has many applications. A finely pointed porous tip may be used, for example, for writing or marking on metals.

While I have described my invention as embodied in concrete form and as operating in a specific manner in accordance with the provisions of the patent statutes, it should be understood that I do not limit my invention thereto since various modifications thereof will suggest themselves to those skilled in the art without departing from the spirit of my invention the scope of which is set forth in the annexed claims.

What I claim as new and desire to secure by Letters Patent of the United States is:

1. A soldering device comprising a tip made of porous sintered tungsten adapted to absorb molten solder, said tip being provided with a working surface, and means for applying molten solder to a different portion of said tip than said working surface so that solder is fed through said tip to said working surface.

2. A soldering iron comprising a tip made of porous material adapted to absorb molten solder, said tip being provided with a working surface, and means for applying solder to a different portion of said tip than said working surface, whereby solder is fed through said tip to said working surface.

3. A soldering iron comprising a tip made of a porous material adapted to absorb molten solder, a holder for said tip providing a reservoir for molten solder communicating with said tip, and heating means for said holder.

4. A soldering iron comprising a soldering tip of porous sintered tungsten adapted to absorb molten solder, and a reservoir for molten solder communicating with said tip.

In witness whereof, I have hereunto set my hand this 28th day of December, 1926.

ROBERT PALMER.